United States Patent [19]

Lessard

[11] Patent Number: 5,522,685
[45] Date of Patent: Jun. 4, 1996

[54] SNOWMOBILE TRANSPORT AID

[76] Inventor: Jean-Luc P. Lessard, 80 Cote Street, Chelmsford, Ontario, Canada, POM-ILO

[21] Appl. No.: 345,893

[22] Filed: Nov. 28, 1994

[51] Int. Cl.6 ........................................................ B60P 7/14
[52] U.S. Cl. ............................... 410/121; 410/2; 410/94; 410/129; 410/139; 296/26; 296/50; 248/354.5; 248/552
[58] Field of Search .................... 410/2, 7, 8, 94, 410/121, 127, 129, 130, 132, 139; 296/26, 50; 248/354.5, 500, 503, 507, 552

[56] References Cited

U.S. PATENT DOCUMENTS

| | | | |
|---|---|---|---|
| 2,712,470 | 7/1955 | Cardini | 296/26 X |
| 2,747,476 | 5/1956 | Manuel | 296/26 X |
| 2,852,303 | 9/1958 | Hopson | 296/26 X |
| 3,527,371 | 9/1970 | Townsend . | |
| 3,593,672 | 7/1971 | Breen | 410/129 |
| 3,612,366 | 10/1971 | Schneider et al. . | |
| 3,726,423 | 4/1973 | Miron . | |
| 4,114,944 | 9/1978 | Joynt et al. | 296/50 |
| 4,502,619 | 3/1985 | Cox | 410/121 X |
| 4,796,909 | 1/1989 | Kirkendall | 296/26 X |
| 4,880,342 | 11/1989 | Pradovic | 410/121 |
| 4,951,991 | 8/1990 | Haigler | 296/26 |
| 5,044,845 | 9/1991 | Baker | 410/3 |
| 5,085,395 | 2/1992 | Frater et al. | 248/552 |
| 5,352,008 | 10/1994 | Denvir | 296/50 |

FOREIGN PATENT DOCUMENTS

| | | | |
|---|---|---|---|
| 1089158 | 3/1955 | France | 248/354.5 |
| 291298 | 6/1991 | Germany | 410/129 |
| 2238988 | 6/1991 | United Kingdom | 410/130 |

*Primary Examiner*—William E. Terrell
*Assistant Examiner*—Stephen Gordon

[57] ABSTRACT

An snowmobile transport aid including a vertically disposed panel having a series of legs orthogonally disposed thereon is detachably affixed to the bed of a pickup truck for the purpose of securing a snowmobile in the truck bed during transport. The legs of the snowmobile transport aid slidably engage a series of leg engagement members having a series of pins locking the legs to the truck body. An alternate embodiment includes a flexible fabriclike panel affixed to the truck using straps and tensioning devices.

1 Claim, 4 Drawing Sheets

SNOWMOBILE TRANSPORT AID

BACKGROUND OF THE INVENTION

1. Field of the Invention

The present invention relates to snowmobile transport equipment and more particularly pertains to a snowmobile transport aid which may be employed to secure a snowmobile within the bed of a motor vehicle commonly known as a pickup truck.

2. Description of the Prior Art

The use of snowmobile transport apparatus is known in the prior art. More specifically, snowmobile transport apparatus heretofore devised and utilized for enabling transport of snowmobiles are known to consist basically of familiar, expected and obvious structural configurations, notwithstanding the myriad of designs encompassed by the crowded prior art which have been developed for the fulfillment of countless objectives and requirements.

The present invention is directed to improving devices for an snowmobile transport aid in a manner which is safe, secure, economical and aesthetically pleasing.

For example, U.S. Pat. No. 5,044,845 to Baker, Jr. discloses a platform comprising a series of slots, hooks, and rod members to maintain the snowmobile in position upon the platform during transport. The Baker, Jr. invention requires access to areas beneath the platform thereby rendering the apparatus substantially unusable in the flat bed of a pickup truck, and furthermore the series of manually operated levers employed therein would be substantially impossible to access in a truck bed having raised sidewalls. The present invention comprises a simple attachment to a pickup truck bed wherein a snowmobile may be secured and transported with relative ease.

In U.S. Pat. No. 3,726,423 to Miron a vehicle attachment for transporting snowmobiles is disclosed. The Miron invention comprises a dual sectioned ramp having a tiltable first section influenced by a hydraulic system and having a latching hook disposed thereon to load and maintain a snowmobile in the bed of a truck. The final disposition of the snowmobile in the Miron invention is at a position high above the truck rear axle and some disadvantageous rise in the loaded truck center of gravity is anticipated. The present invention requires no hydraulic system, ramps, or platforms other than existent as a portion of a pickup truck. And the present invention minimizes adverse raising of the center of gravity of the loaded truck.

In U.S. Pat. No. 3,612,366 to Schneider et al. snowmobile carriers for automobiles each comprising an angularly disposed platform supported by roof, trunk, and trailer hitch support members is described. The Schneider et al. invention is designed to provide attachment of a snowmobile to an automobile and is not generally employable for pickup trucks. The present invention is inapplicable for use with automobiles and is devised to hold a snowmobile in the bed of a pickup truck for transport.

In U.S. Pat. No. 4,114,944 to Joynt et al. a telescopic tailgate extension is disclosed for providing a powered means of extending a tailgate when the tailgate is pivotally disposed in a substantially horizontal position thereby enhancing the load carrying capability of a vehicle to which attached. A disadvantage in this prior art lies in a lack of means for maintaining a snowmobile fixed in a bed of a pickup truck during vehicular acceleration and deceleration. The present invention requires no external power and is adapted to maintain a snowmobile within the bed of a pickup truck during period of acceleration, deceleration, and during period of travel over substantially rough road surfaces.

U.S. Pat. No. 3,527,371 to Townsend, Jr. discloses a snowmobile carrier apparatus for motor vehicles. The disclosure teaches a split foldable elongated snowmobile deck affixed to an automobile rear portion to provide for transport of a snowmobile yet while providing relatively easy access to a luggage compartment. The disclosure makes no provision for attachment to a pickup truck. The present invention comprises an attachment for a pickup truck and is devised to maintain a snowmobile in the bed of the pickup truck and furthermore has no application to automobiles.

In this respect, the snowmobile transport aid according to the present invention substantially departs from the conventional concepts and designs of the prior art, and in so doing provides an apparatus primarily developed for the purpose of securing a snowmobile within the bed of a pickup truck for transport and temporary secure storage.

Therefore, it can be appreciated that there exists a continuing need for new and improved snowmobile transport apparatus which can be employed to hold a snowmobile securely in the bed of a pickup truck. In this regard, the present invention substantially fulfills this need.

As illustrated by the background art, efforts are continuously being made in an attempt to improve snowmobile transport apparatus. No prior effort, however, provides the benefits attendant with the present invention. Additionally, the prior patents and commercial techniques do not suggest the present inventive combination of component elements arranged and configured as disclosed and claimed herein.

The present invention achieves its intended purposes, objects, and advantages through a new, useful and unobvious combination of method steps and component elements, with the use of a minimum number of functioning parts, at a reasonable cost to manufacture, and by employing only readily available materials.

SUMMARY OF THE INVENTION

In view of the foregoing disadvantages inherent in the known types of snowmobile transport apparatus now present in the prior art, the present invention provides an improved snowmobile transport aid construction wherein the same can be utilized for securing a snowmobile within the bed of a pickup truck for the purpose of transport. As such, the general purpose of the present invention, which will be described subsequently in greater detail, is to provide a new and improved snowmobile transport aid apparatus and method which has all the advantages of the prior art snowmobile transport apparatus and none of the disadvantages.

The invention is defined by the appended claims with the specific embodiment shown in the attached drawings. For the purpose of summarizing the invention, the invention may be incorporated into a durable panel having four tubular members orthogonally disposed at each corner thereof and a pair of elongated parallel through slots disposed near the panel center. The tubular members slidably engage short tubular receptacle affixed to the sides of the truck bed. In operation the existing tailgate of the truck is pivotally placed in a horizontal disposition and a snowmobile is loaded into the truck bed such that the heavier rearmost snowmobile portion is positioned toward the center or cab portion of the truck. The panel is positioned to insert the tubular members in the receptacles provided therein and the panel and tubular members is slidably positioned to engage the panel with a bumper or other feature of the snowmobile. Four pin members are insertably applied to mating holes in the tubular members and complementing receptacles thereby securing the panel and snowmobile to the truck.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In as much as the foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent methods and structures do not depart from the spirit and scope of the invention as set forth in the appended claims.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Therefore, it is an object of the present invention to provide an improved snowmobile transport aid used to secure a snowmobile to the bed of a pickup truck.

It is therefore an additional object of the present invention to provide a new and improved snowmobile transport aid which has all the advantages of the prior art snowmobile transport aids and none of the disadvantages.

It is another object of the present invention to provide a new and improved snowmobile transport aid which may be easily and efficiently manufactured and marketed.

It is a further object of the present invention to provide a new and improved snowmobile transport aid which is of a durable and reliable construction.

An even further object of the present invention is to provide a new and improved snowmobile transport aid which is susceptible of a low cost of manufacture with regard to both materials and labor, and which accordingly is then susceptible of low prices of sale to the consuming public, thereby making such snowmobile transport aids economically available to the buying public.

Still yet another object of the present invention is to provide a new and improved snowmobile transport aid which provides in the apparatuses and methods of the prior art some of the advantages thereof, while simultaneously overcoming some of the disadvantages normally associated therewith.

Still another object of the present invention is to provide a new and improved snowmobile transport aid usable with a variety of existing pickup trucks.

Yet another object of the present invention is to provide a new and improved snowmobile transport aid not requiring external electrical, hydraulic, or pneumatic power to secure a snowmobile in the bed of a pickup truck.

Even still another object of the present invention is to provide a new and improved snowmobile transport aid wherein a snowmobile is lockedly affixed to the bed of a pickup truck.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention. The foregoing has outlined some of the more pertinent objects of this invention. These objects should be construed to be merely illustrative of some of the more prominent features and applications of the present invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
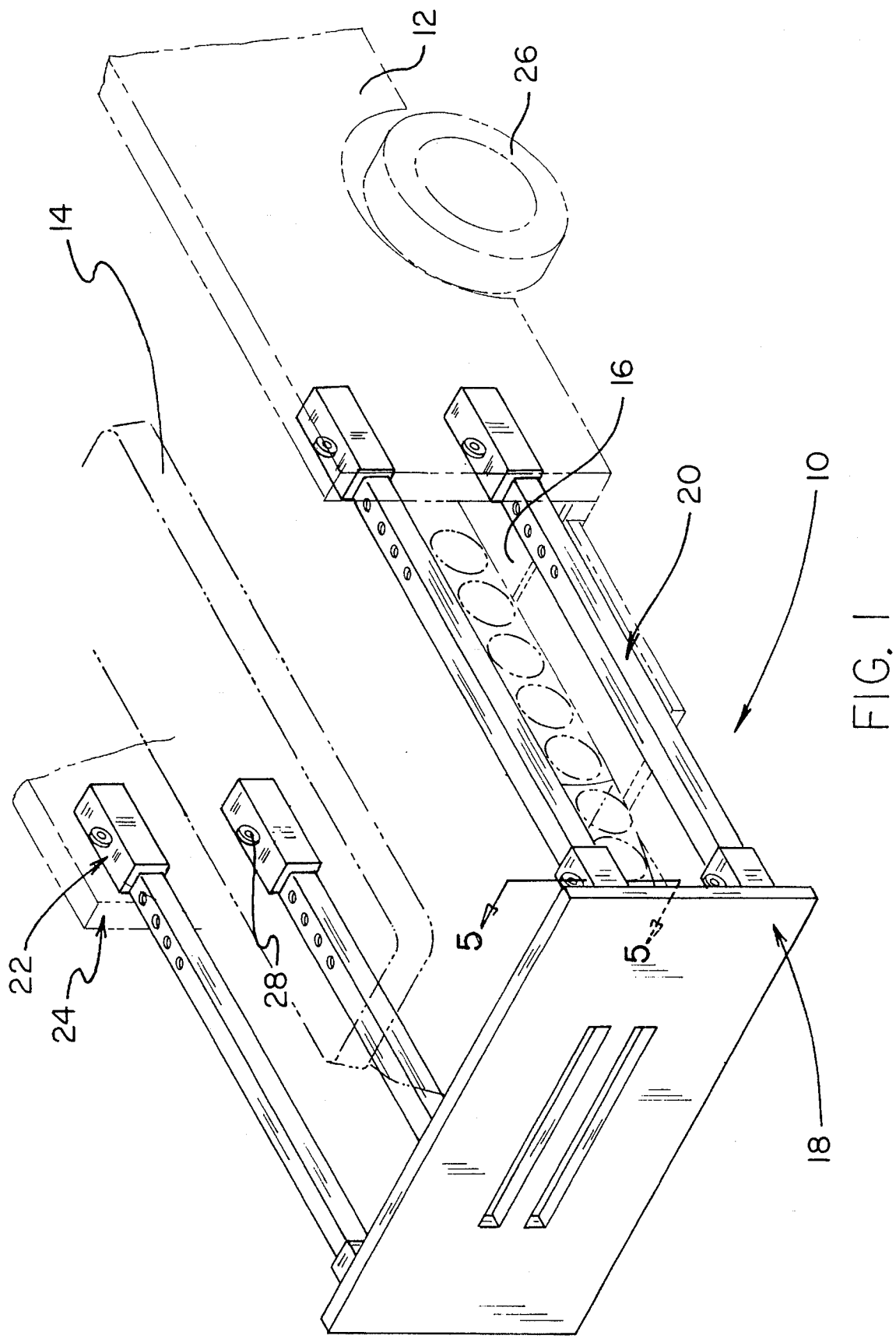
FIG. 1 is a perspective view of the snowmobile transport aid showing the attachment to a pickup truck bed.

With reference now to the drawings, and in particular to FIG. 1 thereof, a new and improved snowmobile transport aid embodying the principles and concepts of the present invention and generally designated by the reference numeral 10 will be described.

From an overview standpoint, the snowmobile transport aid 10 is adapted for use with a pickup truck 12 for the purpose of securing a snowmobile 14 within an existing truck bed 16. See FIG. 1. The snowmobile transport aid 10 comprises a durable panel member 18 having a set of four laterally disposed leg members 20 detachably disposed thereon and a cooperative set of four leg receivers 22 affixed to truck bed sidewalls 24. In operation, snowmobile 14 is positioned in truck bed 16 such that a heavy rearmost portion is disposed most closely to the center of truck 12 thereby more evenly distributing the snowmobile 14 weight among road contacting wheels 26. The snowmobile transport aid 10 is initially assembled having leg members 20 affixed to panel member 18 before being lifted to a position wherein leg members 20 slidably engage leg receivers 22. Leg members 20 are held in a fixed position using pins 28.

Figure 2:
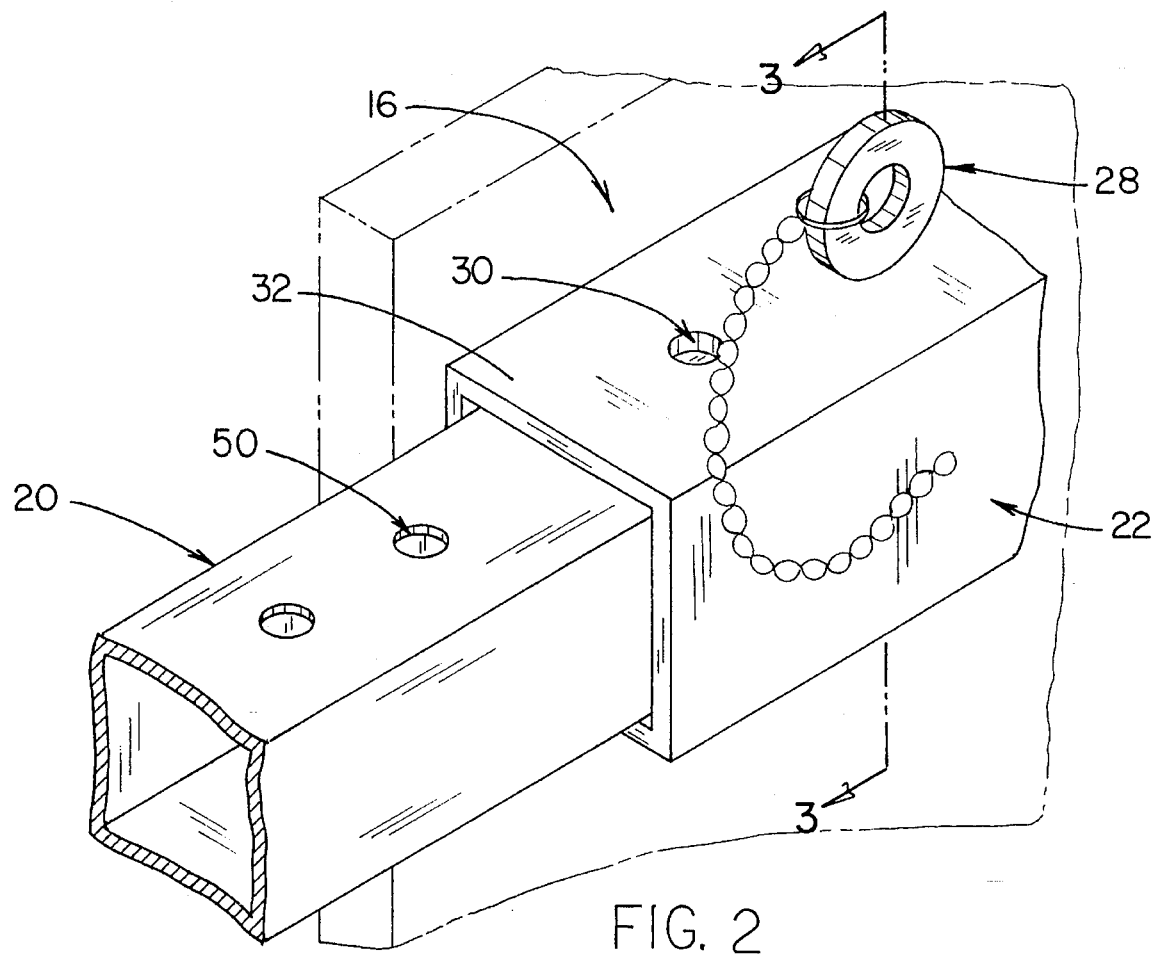
FIG. 2 is a fragmentary perspective view of the snowmobile transport aid showing engagement of a tubular structure with a vehicle mounted receptacle.
Figure 4:
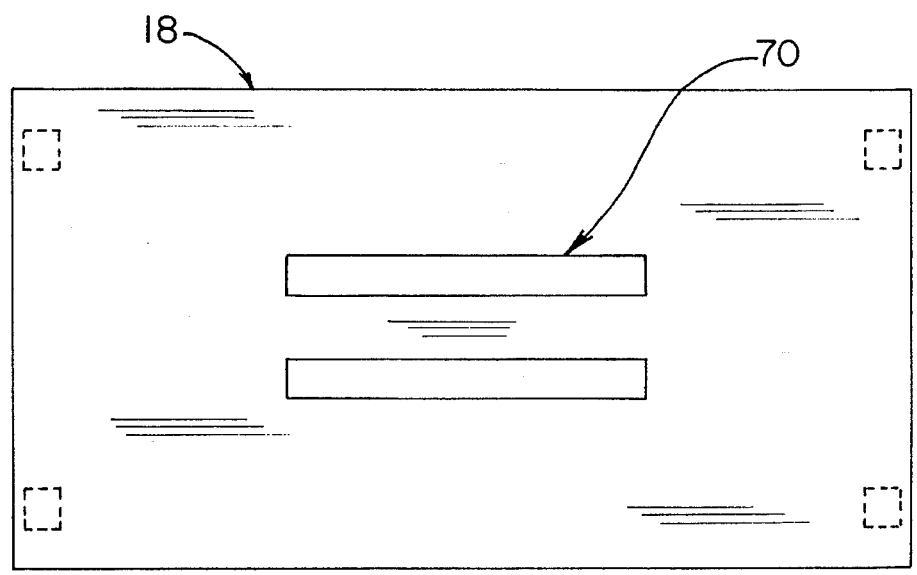
FIG. 4 is side elevational view of the snowmobile transport aid showing the panel member.
Figure 3:
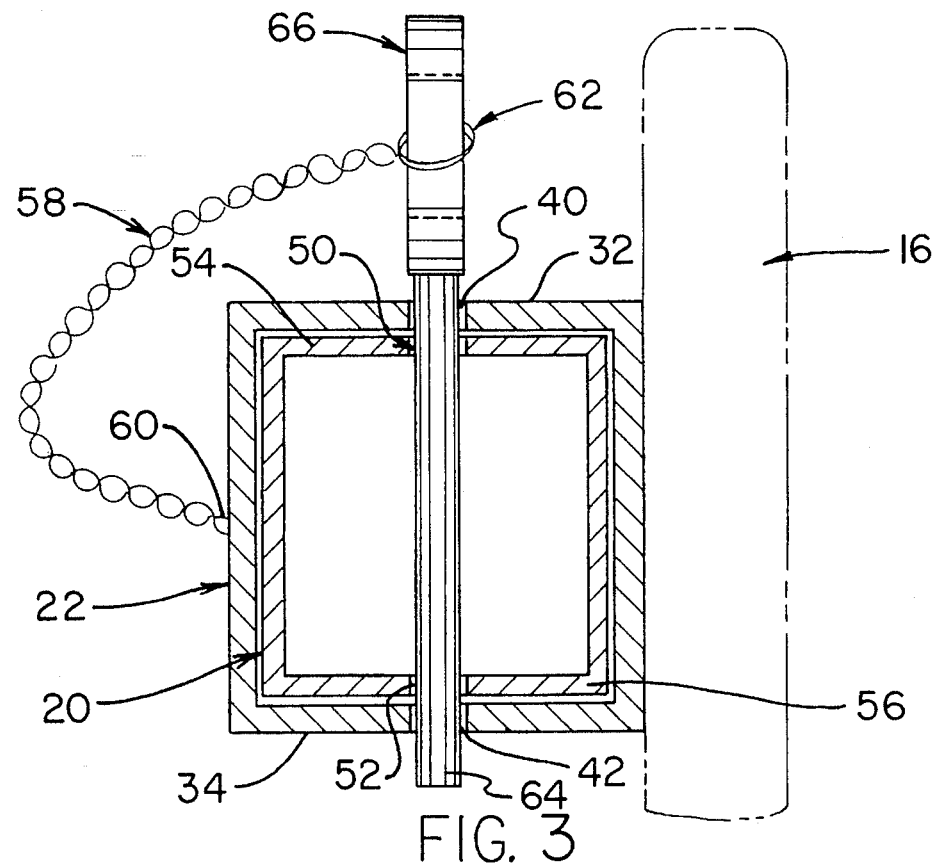
FIG. 3 is a sectional view of the snowmobile transport aid showing a latching means taken substantially upon the plane indicated by the section line 3—3 of FIG. 2.

More specifically, it will be noted that the snowmobile transport aid 10 comprises a substantially planar panel 18 having a series of leg members 20 orthogonally disposed thereon wherein said leg members 20 slidably engage a plurality of leg receivers 22 affixed to portions of truck bed sidewalls 24. Leg receivers 22 comprise a short tubular rectangular form having one or more holes 30 penetrating a first sidewall 32 and a second sidewall 34. See FIG. 2. An axis of hole 40 penetrating first sidewall 32 and an axis of hole 42 penetrating second sidewall 34 are substantially coincident and furthermore are orthogonally disposed to a plane containing sidewall 32. See FIG. 3. Leg member 20 comprises an elongated substantially hollow rectangular tube and has a series of aligned holes 50 and 52 penetrating sidewalls 54 and 56, and furthermore at a particular engagement position holes 40, 42, 50, and 52 are in substantial alignment and pins 28 may be inserted therethrough thereby lockedly affixing the leg member 20 to the leg receiver 22. Leg receivers 22 may be weldedly affixed to truck bed sidewalls 24 or bolted thereon using materials having adequate strength for safely holding a snowmobile 14 during various accelerations and decelerations of truck 12. Pin 28 is permanently attached to leg receiver 22 using chain. Chain 58 attaches to leg receiver 22 at one end 60 using a rivet or threaded fastener, and attaches to the pin 28 using spring loop 62. Pin 28 comprises an elongated rodlike portion 64 and a ring portion 66. Ring portion 66 is welded to an end of rodlike portion 64. Spring loaded detents and a means for maintaining one or more pins 28 in place using a keyed or combination style padlock is feasible and adds security benefits. Pin 28 may in this regard comprise a padlock having an elongated U-shaped locking pin passing through holes 40, 42, 50, and 52 and engaging a lock body thereafter.

Panel member 18 comprises a durable platelike structure having a width substantially equivalent to a standard truck bed 16 lateral dimension and a height substantially equivalent to the height of the truck bed sidewalls 24. See FIG. Elongated slots 70 penetrate the panel 18 and are of size and position to engage a bumper of snowmobile 14. Slots 70 provide some resistance to vertical motion of the snowmobile 14, however alternate means may be employed to limit said vertical motion including a series of horizontally disposed rails affixed to panel member 18 and engaging snowmobile 14, a contoured foamlike frictional engagement pad affixed to panel member 18 and engaging snowmobile 14, or a series of tiedown straps affixed to the panel member 18 or other portions of the snowmobile transport aid 10 or truck 12. The composition of panel member 18 is generally steel or aluminum, however rib strengthened fiberglass may be employed as well as other strong construction materials capable of providing adequate holding response for the snowmobile 14. Construction of the panel member 18 from a metal plate three eighths inch thick is suitable for general application.

Figure 5:
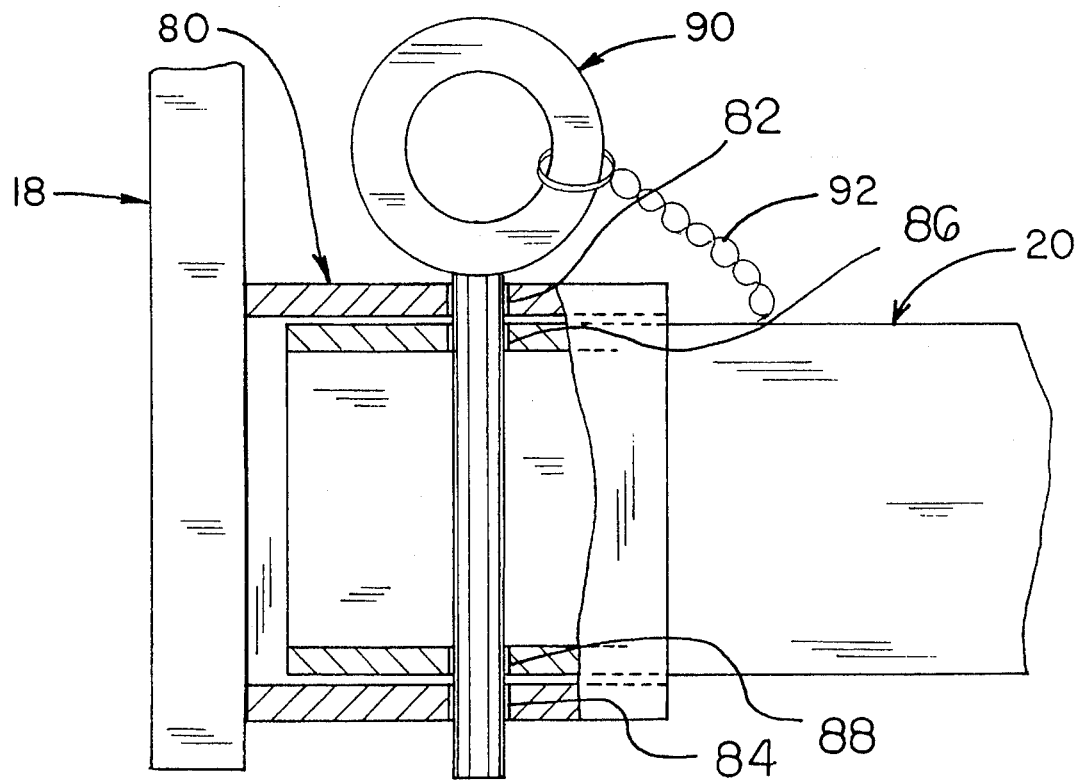
FIG. 5 is a sectional view of the snowmobile transport aid showing a panel member engagement means taken substantially upon the plane indicated by the section line 5—5 of FIG. 1.

Panel engagement member 80 comprises a short length of a rectangular cross section tube having an orthogonally disposed permanent attachment to panel member 18 wherein a major surface thereon is substantially perpendicular to a plane containing a major surface of panel member 18. See FIG. 5. The interior dimensions of panel engagement member 80 are selected to enable slidable engagement of leg member 20, and furthermore a through hole 82 and through hole 84 are opposingly positioned and aligned with through holes 86 and 88 penetrating leg member 20. Pin 90 is slidably disposed within holes 82, 84, 86, and 88 thereby detachably joins leg member 20 and panel member 18. Pin 90 and chain 92 are substantially identical to pin 28 and chain 58 wherein chain 92 attaches to panel engagement member 80 using rivets or threaded fasteners.

Figure 6:
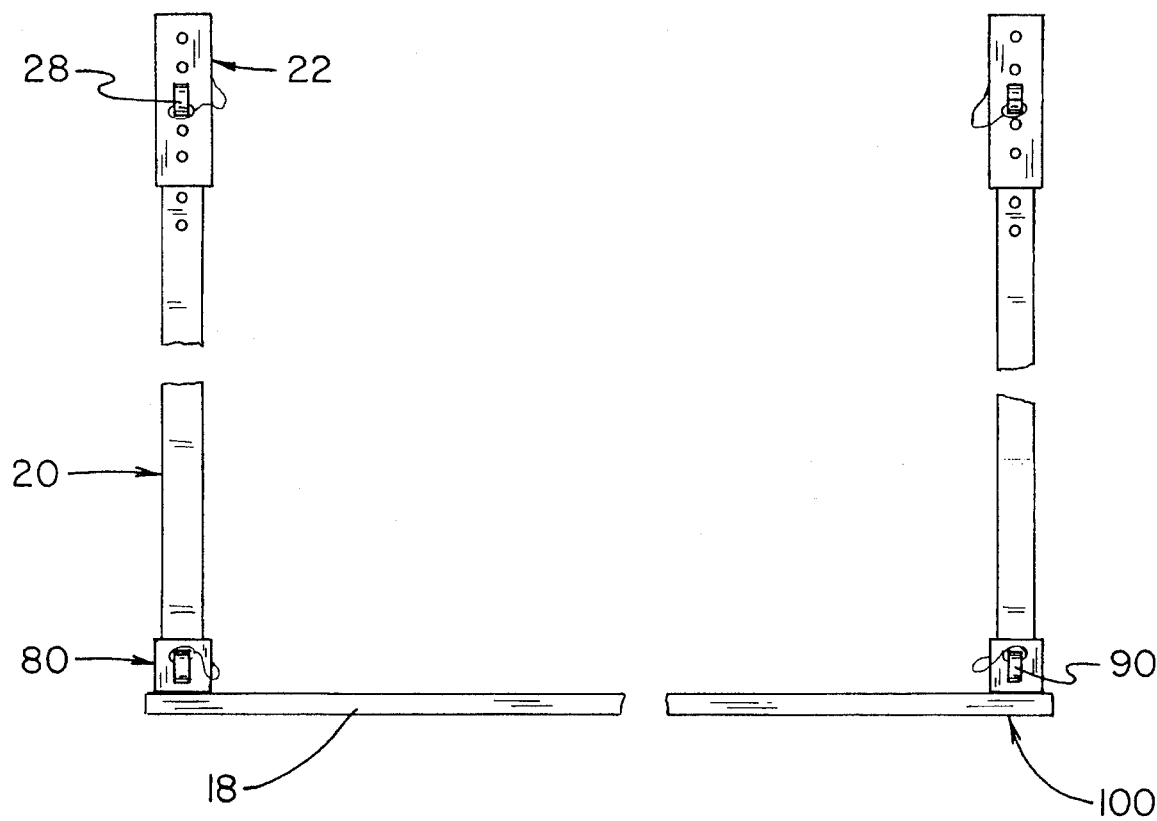
FIG. 6 is a top elevational view of the snowmobile transport aid in a latched position.
Figure 7:
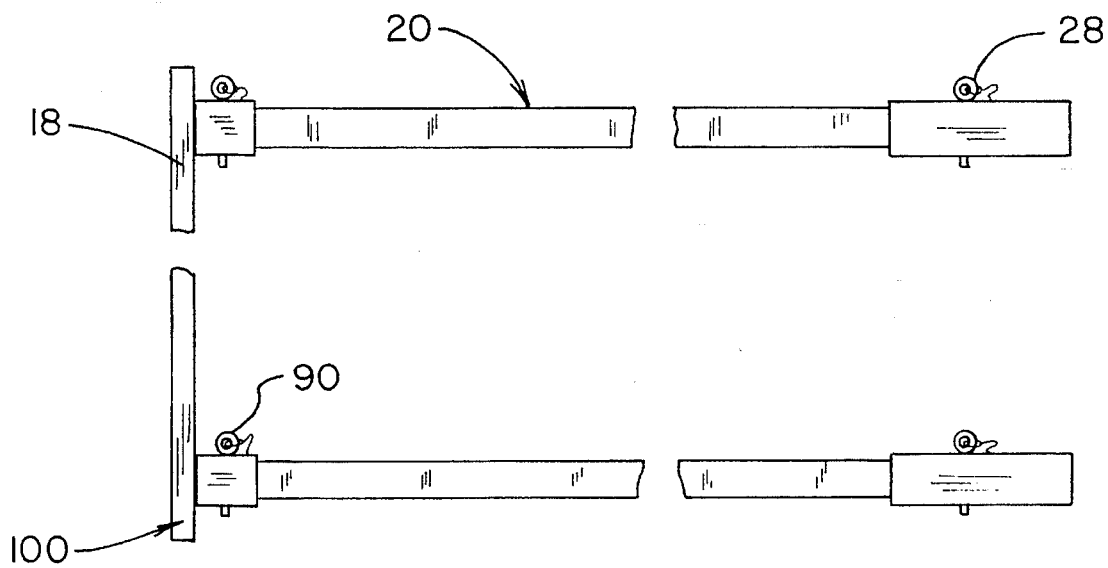
FIG. 7 is a side elevational view of a snowmobile transport aid.

Leg members 20 comprise elongated rectangular tubes of substantial strength having a plurality of holes disposed therein for the purpose of affixing panel member 18 thereto and for adjustably engaging leg engagement member 22. See FIGS. 6 and 7. Four legs are required to support panel member 18 and are mounted near panel member corners 100. Pins 28 and 90 are each vertically disposed and susceptible to purposeful removal and replacement. Pins 28 may be removed to permit adjustment of the panel member 18 to engage the snowmobile 14, and to permit removal of an assembly comprising panel member 18 with panel engagement member 80, leg members 20, and pins 90. Leg members 20 are generally comprised of metal such as aluminum or steel. Some composites and fiberglass may also be employed in leg members 20 if strength is sufficient to hold snowmobile 14 in position. And furthermore, leg members 20, leg receivers 22, and panel engagement members may comprise tubes of substantially circular cross section.

In an alternate embodiment, panel member 18 comprises a strong fabriclike net substantially conforming to a portion of a snowmobile and furthermore leg members 20 comprise fabriclike strap members. Construction material such as heavy duty nylon® and polymeric (such as Kevlar®) woven products may be employed to hold the snowmobile in position. Strap members may have affixed thereon a fastening and tensioning means, or a series of cleats may be employed to secure the straps to the truck bed sidewalls 24 or other portions of the truck 12.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. In as much as the present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts may be resorted to without departing from the spirit and scope of the invention.

What is claimed as being new and desired to be protected by Letters Patent of the United States is as follows:

1. A snowmobile transport aid for holding a snowmobile in a bed of a truck comprising, in combination with said truck; said transport aid comprising:

a flattened platelike panel member having a pair of elongated slots disposed therein and furthermore said elongated slots are substantially aligned with each other and additionally have major slot dimensions aligned with major dimensions of the panel member, the panel member having a rectangular configuration;

a plurality of leg members substantially orthogonally disposed and detachably affixed to said panel member using a panel attachment means, the leg members are substantially hollow tubes of rectangular cross section perforated with a series of through holes, the panel attachment means comprises a short length of hollow tubing corresponding to each leg member and each of slightly greater inside dimension than a corresponding outside dimension of said corresponding leg member thereby providing slidable engagement therein, and furthermore each short length of hollow tubing having a through hole therein which is substantially aligned with a through hole formed through a respective said corresponding leg member engaged therein;

a plurality of leg engagement members affixed to a bed portion of said truck, the leg engagement members comprising a short length of hollow tubing of slightly greater inside dimension than a corresponding outside dimension of a said leg member thereby providing slidable engagement therein, and furthermore each engagement member short length of hollow tubing has a through hole disposed therein which is substantially aligned with a through hole of a corresponding said leg member engaged therein; and a locking means for detachably affixing said leg members to said leg engagement members, the locking means comprising pins slidably engaging the aligned through holes in said leg members and said leg engagement members and furthermore said pins each having an enlarged portion disposed at an end thereof and a chainlike flexible fastening means affixed to said enlarged portion at one end and to said respective leg engagement member at an opposite end.

* * * * *